United States Patent [19]

Asai

[11] Patent Number: 5,293,751
[45] Date of Patent: Mar. 15, 1994

[54] METHOD AND SYSTEM FOR THROWING CARBON DIOXIDE INTO THE DEEP SEA

[75] Inventor: Koetsu Asai, Nagasaki, Japan

[73] Assignee: Mitsubishi Jukogyo Kabushiki Kaisha, Tokyo, Japan

[21] Appl. No.: 953,186

[22] Filed: Sep. 29, 1992

Related U.S. Application Data

[63] Continuation of Ser. No. 546,909, Jul. 2, 1990, abandoned.

[30] Foreign Application Priority Data

Jul. 19, 1989 [JP] Japan ................... 1-186319

[51] Int. Cl.$^5$ ............................... F17C 1/00
[52] U.S. Cl. ....................... 62/53.1; 62/240; 405/203; 405/210; 588/250
[58] Field of Search ............... 62/260, 50.1, 53.1, 62/240; 114/74 R; 405/210, 203; 165/45; 588/250

[56] References Cited

U.S. PATENT DOCUMENTS

| | | | |
|---|---|---|---|
| 3,727,418 | 4/1973 | Glazier | 62/53.1 |
| 4,232,983 | 11/1980 | Cook | 405/210 |
| 4,239,510 | 12/1980 | Hays | 55/68 |
| 4,672,906 | 6/1987 | Asai | 114/74 |

FOREIGN PATENT DOCUMENTS

| | | |
|---|---|---|
| 249589 | 12/1987 | European Pat. Off. |
| 3546465 | 5/1987 | Fed. Rep. of Germany |
| 56-18199 | 2/1981 | Japan ........... 62/53.1 |

OTHER PUBLICATIONS

Steinberg et al., BNL-27164, "Environmental Control Technology for Atmospheric Carbon Dioxide", 1980 Munter Germany.
Patent Abstracts of Japan, vol. 8, No. 47, (M-280)(1484) Mar. 2, 1984.
JP-A-58 202182 (Koube Dock Kogyo K.K.) Nov. 25, 1983.
"Transportation System for $CO_2$ into Deep Sea (1st Report)"(Journal of the Society of Naval Architects of Japan, vol. 170, Dec. 1991).
"Transportation System for $CO_2$ into Deep Sea (2nd report)"(Journal of the Society of Naval Architects of Japan, vol. 171, Jun. 1992).
"Design and Strength Estimation of New-Type Cylindrical Tank for Liquefied Gas" (Journal of the Society of Naval Architects of Japan, vol. 170, Dec. 1991).
"System Study on Sending $CO_2$ into Deep Ocean for $CO_2$ Recovery and Ocean Storage" (The 18th Meeting of the US/Japan Marine Facilities Panel of UJNR, Oct. 1992).
Opinion of the British Coal Corporation against the corresponding EPC application (Jan. 1992).
"On Geoengineering and the $CO_2$ Problem" (Marchetti's paper, 1987).
"The Collection, Disposal, and Storage of Carbon Dioxide" (Baes's paper, 1980).
"Environmental Control Technology for Atmospheric Carbon Dioxide" (Steinberg's paper, 1980).
Communication from EPO on the corresponding EPC application (Nov. 1992).
"A System Study for the Removal, Recovery and Disposal of Carbon Dioxide from Fossil Fuel Power Plants in the U.S." (Steinberg's paper, 1984).

*Primary Examiner*—Ronald C. Capossela
*Attorney, Agent, or Firm*—Wenderoth, Lind & Ponack

[57] ABSTRACT

Carbon dioxide gas collected from combustion exhaust gas or the like is transported in a liquefied gas state on the sea by means of ships up to a marine float installation provided with a throw-in pipe reaching to the deep sea, and then the liquefied carbon dioxide is thrown into the deep sea through the throw-in pipe.

3 Claims, 4 Drawing Sheets

METHOD AND SYSTEM FOR THROWING CARBON DIOXIDE INTO THE DEEP SEA

This application is a continuation of now abandoned application, Ser. No. 07/546,909, filed Jul. 2, 1990.

BACKGROUND OF THE INVENTION

1. Field of the Invention:

The present invention relates to a method and a system for throwing carbon dioxide collected from combustion exhaust gas or the like into the deep sea.

2. Description of the Prior Art

The problem of warming up of the earth due to increase of a carbon dioxide gas concentration in the atmosphere has been being discussed over the world, and as one of countermeasures for this problem, there is an idea that the increase of a carbon dioxide gas concentration in the atmosphere is suppressed by industrially collecting carbon dioxide from combustion exhaust gas or the like and throwing it into the deep sea.

This idea is based on the fact that while the sea water in the surface layer of the ocean is held in contact with the atmosphere and is closely related to the atmosphere because of existence of its movement such as waves, tides and the like, since movement of the sea water in the portion deeper than about 100 m is very little and its communication with the sea water in the surface layer is little, it is presumed that if collected carbon dioxide is appropriately thrown into the deep sea, the carbon dioxide would not come out into the atmosphere over a long period or substantially semipermanently. Also, the idea is based on the fact that carbon dioxide of the amount several tens times as much as that in the atmosphere is present in a resolved state in the deep sea water, and so the influence in the event that the artificially thrown carbon oxide is added to this resolved carbon dioxide, is presumed to be faint.

FIG. 4 is a general conceptional view showing one example of the prior art method in which carbon dioxide is transported on the sea by means of ships and is then thrown into the deep sea.

In a heat power station 1, combustion exhaust gas containing carbon dioxide gas is generated from a boiler, and after carbon dioxide gas has been separated and collected from the exhaust gas it is solidified in a carbon dioxide gas collecting and processing apparatus 2. In other words, solid carbon dioxide (commonly called "dry ice") is produced. The temperature of this solid carbon dioxide is about $-78°$ C. under the atmospheric pressure as shown in FIG. 2, and it is temporarily stored in a solid carbon dioxide storage warehouse 3. Then, the solid carbon dioxide is loaded on a solid carbon dioxide transport ship 4, and is transported on the sea up to a predetermined sea region, where it is thrown down out of the ship. The specific gravity of the thrown solid carbon dioxide is about 1.5, and so it sinks due to its own gravity and reaches to the deep sea. The transport ship 4 returns to the original quay after throwing, and it performs transportation and throwing of solid carbon dioxide repeatedly.

FIG. 5 is a flow chart showing a process of producing solid carbon dioxide from carbon dioxide gas. Carbon dioxide gas 11 is compressed at 12 by means of a compressor and thereafter it is cooled and condensed at 13 into liquefied carbon dioxide 14. If this is subjected to adiabatic expansion at 15 by making it spout from a nozzle, about 30-60% of the liquefied carbon dioxide would evaporate, but the remaining liquefied carbon dioxide would become snowflake-shaped solid carbon dioxide 17 due to removal of the evaporation heat, and this is press-molded at 18 into solid carbon dioxide (commonly called "dry ice").

However, the throwing of carbon dioxide into the deep sea in the prior art as explained above, has the following shortcomings:

1. In the case of solidifying collected carbon dioxide, as compared to the case of liquefying it, the installation becomes expensive, and a lot of power for operating the installation becomes necessary. Furthermore, regarding the loading work onto a ship and the like, handling of solid carbon dioxide is troublesome as compared to the case of liquefied carbon dioxide.
2. Solid carbon dioxide thrown down out of a ship would evaporate furiously due to contact with the sea water, and a part of the evaporated carbon dioxide would escape into the atmosphere. In other words, there is a loss of carbon dioxide in the midway of throwing into the deep sea.
3. There is an evaporation loss of carbon dioxide during a loading work onto a ship and during transportation, and furthermore, there is a fear that throwing down into a sea region other than a contemplated throwing sea region may be executed easily against the contemplated schedule. Therefore, and also as a result of the shortcomings described in the preceding two numbered paragraphs, it was difficult to precisely know when, where and by what amount throwing into the deep sea of carbon dioxide was executed.

SUMMARY OF THE INVENTION

It is therefore one object of the present invention to provide a method and a system for throwing carbon dioxide into the deep sea which are free from the above-mentioned shortcomings of the method and the system in the prior art.

According to one feature of the present invention, there is provided a method for throwing carbon dioxide into the deep sea, consisting of the steps of transporting carbon dioxide in a liquefied gas state on the sea by means of ships, and throwing the liquefied carbon dioxide into the deep sea through a throw-in pipe reaching to the deep sea provided on a marine float installation.

According to another feature of the present invention, there is provided a system for throwing carbon dioxide into the deep sea, comprising a liquefied gas transport ship, and a marine float installation having a deep sea throw-in pipe.

According to the present invention, owing to the aforementioned novel features, the following advantages are obtained:

1. The state of carbon dioxide to be loaded on a ship is a liquefied state, and there is no need to solidify carbon dioxide. In addition, the state of carbon dioxide upon a work of loading on a ship is also a liquefied state which can be easily handled.
2. As the carbon dioxide to be thrown into the deep sea passes through a throw-in pipe until it reaches to the deep sea, it would be never lost in the midway.
3. An evaporation loss of carbon dioxide during the work of loading on a ship and during transportation on the sea is not present, and the route for throwing liquefied carbon dioxide into the deep sea is limited to within the deep sea throw-in pipe.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 1:
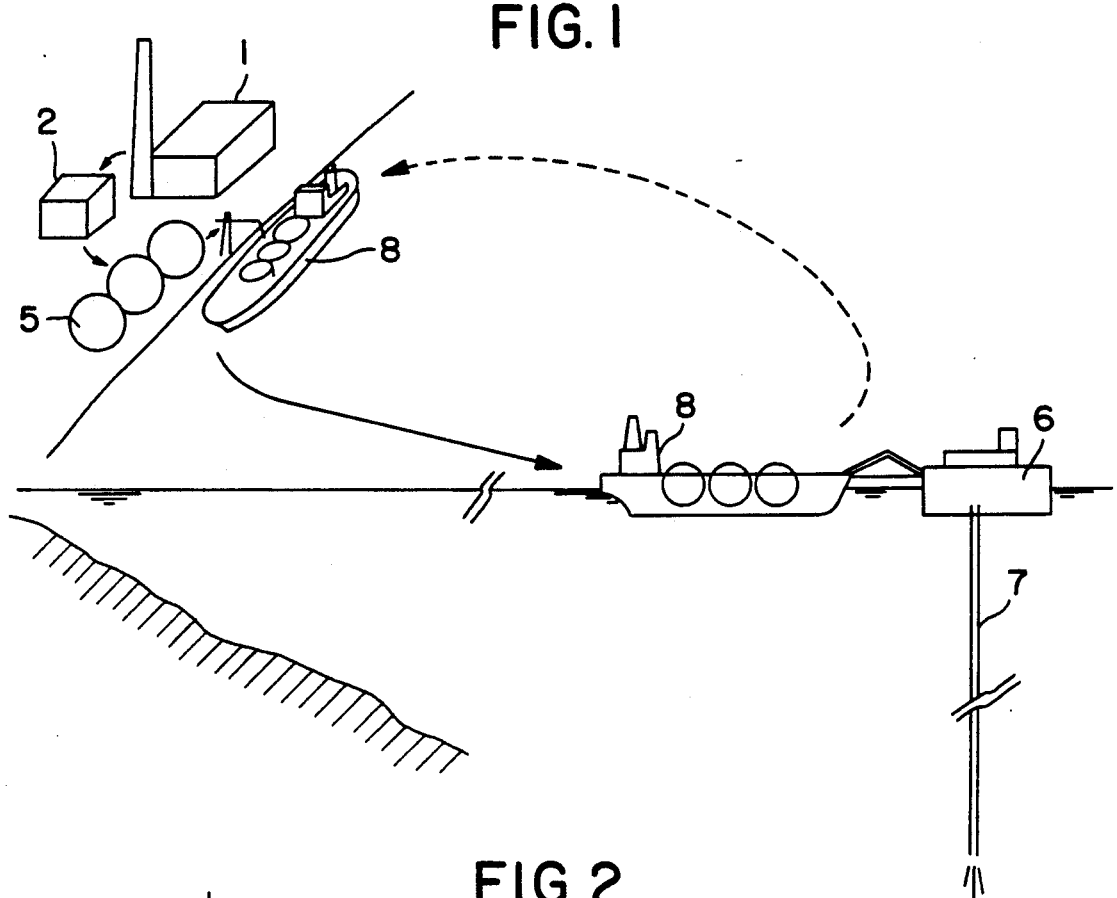
FIG. 1 is a general conceptional view showing one preferred embodiment of the present invention.

In the following, the method and system for throwing carbon dioxide into the deep sea according to the present invention will be described in greater detail with reference to the accompanying drawings. A general conceptional view showing one preferred embodiment of the present invention is illustrated in FIG. 1. In this figure, carbon dioxide gas is collected from combustion exhaust gas containing carbon dioxide gas which was generated in a thermal power station 1, and is further liquefied, in a carbon dioxide gas collecting and processing apparatus 2. The liquefied carbon dioxide is temporarily stored in storage tanks 5 until it is loaded on a ship. Reference numeral 6 designates a marine float installation, which is floating on a sea region, for instance, 200 miles far from a quay and as deep as 4000 m. The marine float installation 6 is provided with a thrown-in pipe 7 of about 3000 m in length as suspended therefrom, and in addition, although omitted from illustration, there is provided a dynamic positioning apparatus for enabling the marine float installation 6 to stay in the designated sea region, a metering apparatus for the carbon dioxide to be thrown into the deep sea and various piping equipments. Between the storage tanks 5 on the land and the marine float equipment 6, the liquefied carbon dioxide is transported on the sea by means of liquefied carbon dioxide transport ships 8.

The temperature of liquefied carbon dioxide to be transported is, for instance, about $-50°$ C. at the pressure of about 7 kgf/cm$^2$, about 2° C. at about 38 kgf/cm$^2$ or about 15° C. at about 52 kgf/cm$^2$. These temperatures and pressures are of commonly used levels, hence a lot of experience has been accumulated in design, manufacture and operation of the installation, and therefore, the proposed system is appropriate for handling a large amount of liquefied carbon dioxide.

Liquefied carbon dioxide is loaded on the ship 8 from a quay in the vicinity of the storage tanks 5, and is transported on the sea up to the marine float installation 6. The ship is moored at the marine float installation 6, and liquefied carbon dioxide is thrown into the deep sea of about 3000 m in depth through the throw-in pipe 7. The temperature of the liquefied carbon dioxide becomes equal to the temperature of the surrounding sea water while it passes through the long throw-in pipe 7. The liquefied carbon dioxide discharged from the bottom end of the throw-in pipe 7 partly mixes with the surrounding sea water and resolves in the sea water or produces hydrates, but the remainder sinks further deep, and after having reached to the bottom of the deep sea, it resolves gradually in the sea water and diffuses away.

Figure 2:
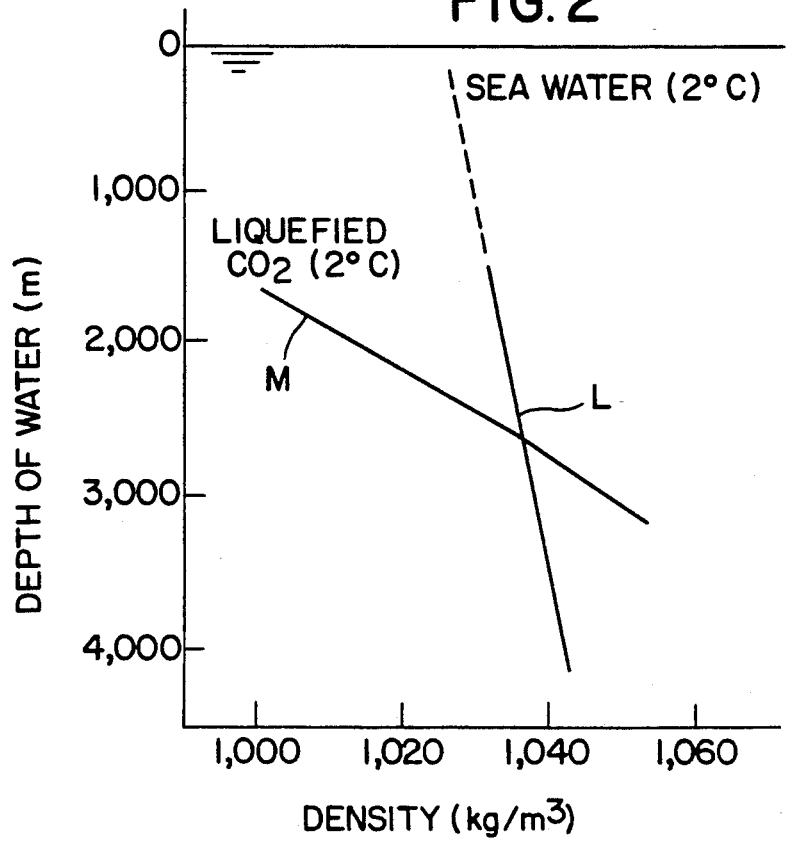
FIGS. 2 and 3 are diagrams showing the states of carbon dioxide and the sea water, respectively.

FIG. 2 is a diagram showing the relation in densities between the sea water and liquefied carbon dioxide in the deep sea. Principal factors affecting the density of the sea water are a temperature, a salt concentration and a pressure (depth of water), but a temperature and a salt concentration of the sea water in the deep sea of 2000 m or more in depth are very uniform over all the sea regions, and the temperature is about 2° C. and the salt concentration is about 3.5%. On the basis of this knowledge, a line showing a density of the sea water corresponding to various depths of water is depicted at L in FIG. 2, and another line showing a density of liquefied carbon dioxide under the same temperature and pressure (depth of water) is depicted at M in FIG. 2. This diagram shows the fact that in the deep sea of 3,000 m in depth, the density of the liquefied carbon dioxide discharged from the bottom end of the throw-in pipe 7 is larger than that of the surrounding sea water.

Figure 3:
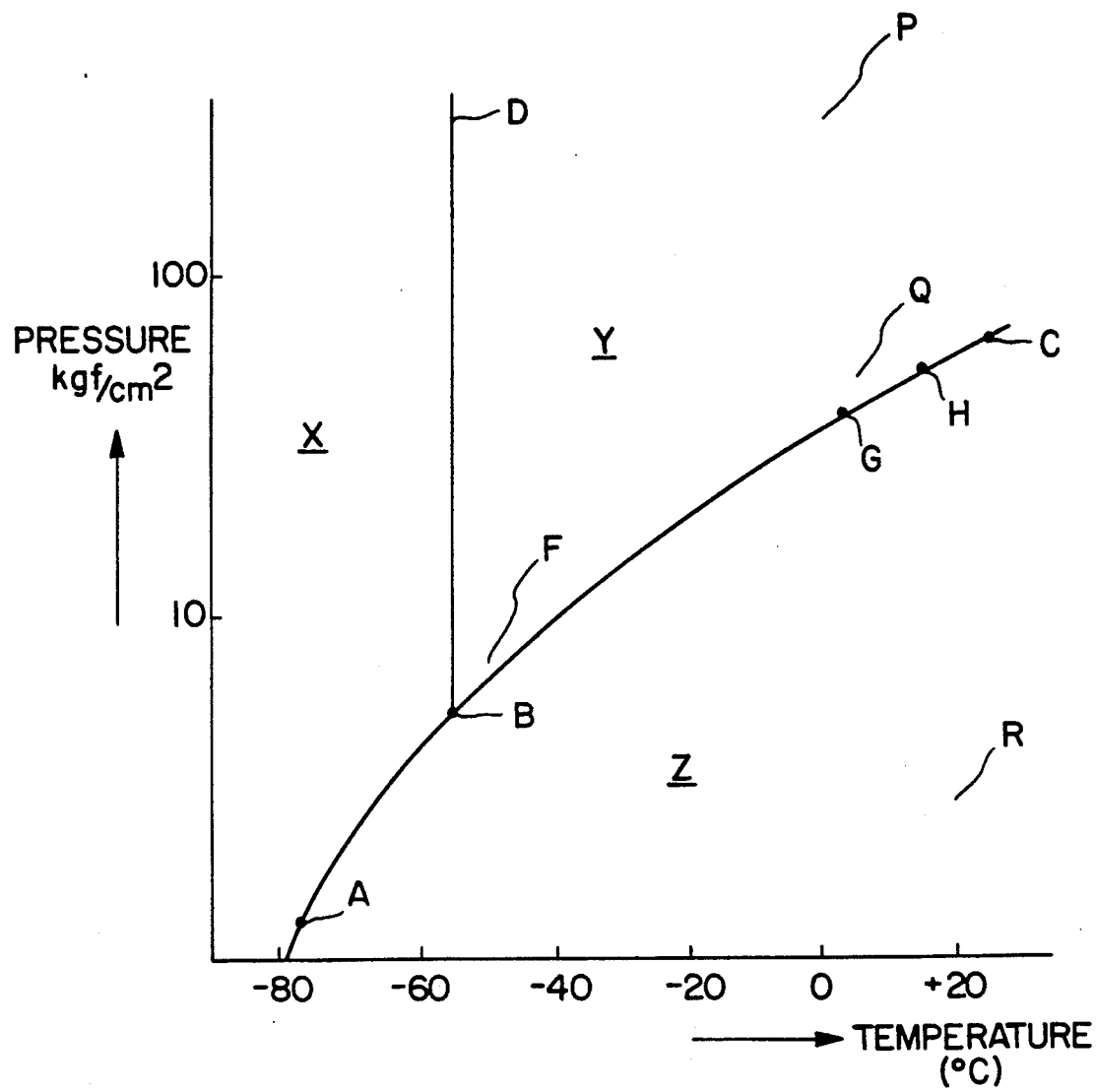
Figure 4:
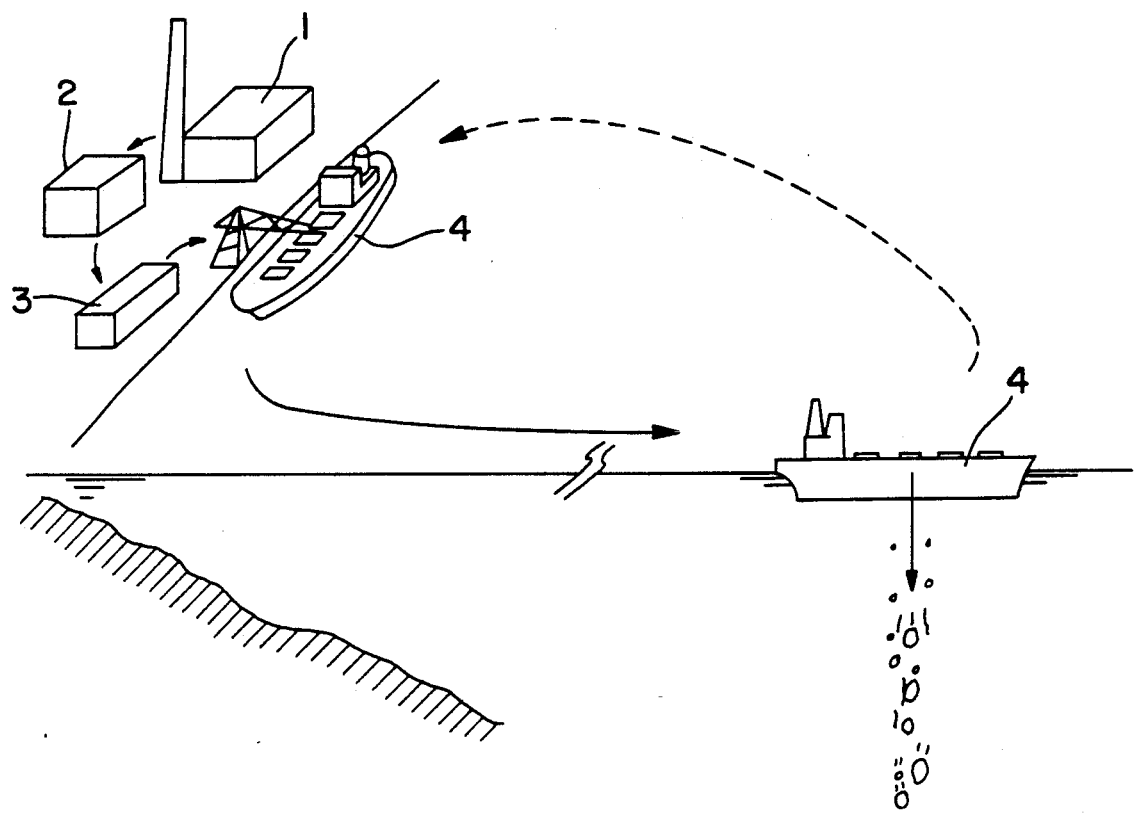
FIG. 4 is a general conceptional view showing one example of the method for throwing carbon dioxide into the deep sea in the prior art.
Figure 5:
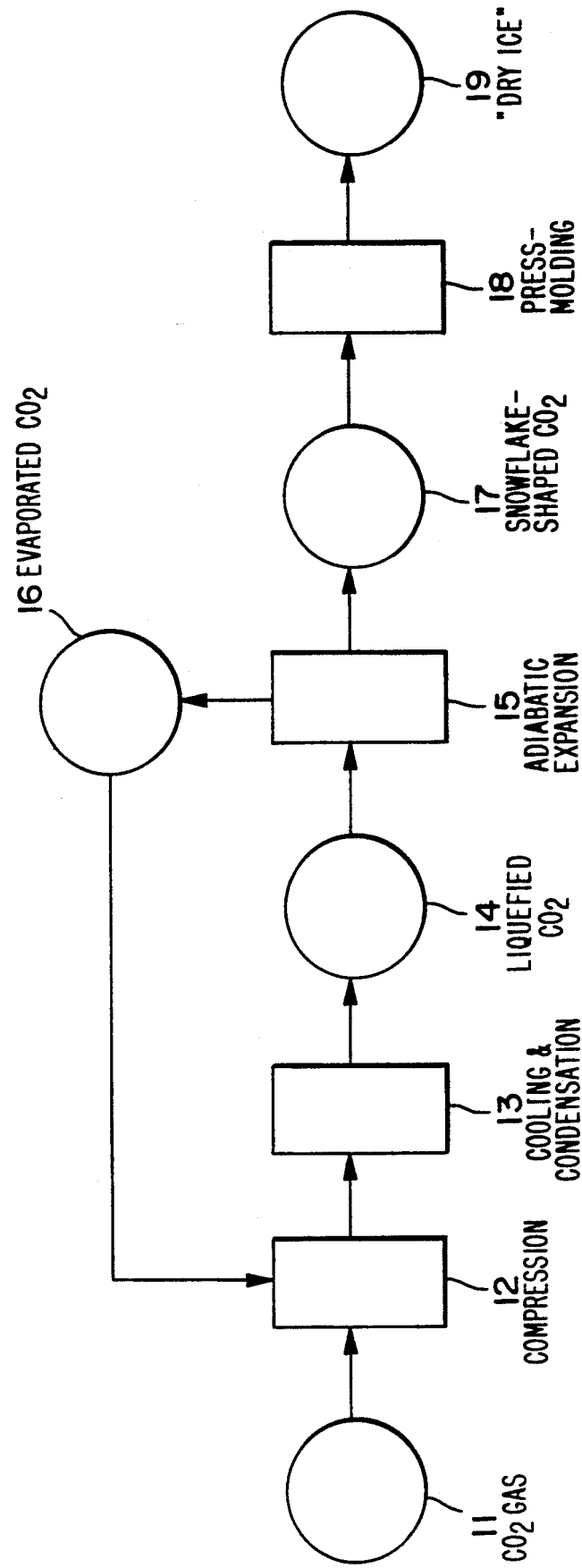
FIG. 5 is a flow chart showing a process of producing solid carbon dioxide from carbon dioxide gas.

FIG. 3 is a diagram to be referred to for explaining the states of carbon dioxide and the sea water, in which a temperature is represented in a uniform scale along the abscissa and a pressure is represented in a logarithmic scale along the ordinate. At first, explaining the state of carbon dioxide, the state is divided into three regions (X, Y and Z) by two lines A - B - C and B - D, and carbon dioxide is solid in the state corresponding to the region (X) on the left upper side of the line A - B - D in FIG. 3, liquid in the state corresponding to the region (Y) on the right upper side of the line B - D - C, and gas in the state corresponding to the region (Z) on the right lower side of the line A - B - C. The point B represents a triple point corresponding to about 5.3 Atm. and about $-57°$ C. Liquefied carbon dioxide can exist only under the condition of higher pressure than this particular pressure. The state of the liquefied carbon dioxide during transportation on the sea in the illustrated embodiment of the present invention correspond to a point F, G or H. The point F is a point as close as possible to the triple point B, the point G is a point corresponding to the sea water temperature in the deep sea, and the point H is a point corresponding to the ordinary temperature. Comparing the point F and the point H, the tank in the liquefied carbon dioxide transport ship would become more expensive for a cargo at the point H than in the case of a cargo at the point F because it is a tank durable against a higher pressure, but the power necessitated for liquefying carbon dioxide gas can be reduced. The optimum temperature and pressure conditions should be determined by taking these problems generally into consideration, and they should not be limited to only the above-referred point F, G or H.

In addition, the states of the sea water are indicated at points P, Q and R. The point P indicates, by way of example, a pressure and a temperature of the sea water at a depth of 3000 m, the point Q indicates a pressure and a temperature of the sea water at a depth of 500 m, and the point R indicates a pressure and a temperature of the sea water at a depth of 30 m.

If the length of the throw-in pipe 7 should be as short as about 30 m, the liquefied carbon dioxide would be discharged into the sea water indicated by the point R, hence the discharged carbon dioxide would immediately evaporate, float up and go out into the atmosphere, and the object of throwing carbon dioxide into the deep sea cannot be achieved. Or else, if the length of the throw-in pipe 7 should be about 500 m, the liquefied carbon dioxide would be discharged into the sea water indicated by the point Q. While the carbon dioxide under this pressure and temperature condition would not immediately evaporate because it is liquid, it has a density smaller than that of the sea water under the same pressure and temperature condition. Consequently, the liquefied carbon dioxide discharged from the bottom end of the throw-in pipe would float up as influenced by the temperature and pressure of the surrounding sea water, and evaporation would commence at the depth of water where its pressure has been appropriately reduced in the midway of float-up. Therefore, a part of the thrown carbon dioxide would resolve in the sea water, but the remainder would evaporate and escape into the atmosphere, and so, there is a loss with respect to the inherent object of throwing carbon dioxide into the deep sea.

In the illustrated embodiment of the present invention, the length of the throw-in pipe 7 is assumed to be about 3000 m. Hence, liquefied carbon dioxide would be discharged into the sea water indicated at the point P. Carbon dioxide under this pressure and temperature condition has a larger density than that of the sea water under the same pressure and temperature condition. Consequently, the liquefied carbon dioxide discharged from the bottom end of the throw-in pipe 7 would partly mix with the surrounding sea water and would resolve in the sea water or produce hydrates, and the remainder not resolved in the surrounding sea water would further sink deeper due to its own gravity, so that the total amount of carbon dioxide thrown into the deep sea of about 3000 m in depth can meet the inherent object of throwing carbon dioxide into the deep sea.

If the liquefied carbon dioxide loaded on the transport ship 8 should be thrown away outside of the ship without employing a special equipment, then a large amount of evaporation would occur immediately, hence throwing into a sea region other than the contemplated sea region is substantially impossible, and it can be thrown into the deep sea only through the throw-in pipe 7. Assuming that a liquefied carbon dioxide loadage of the transport ship 8 is 30,000 t, loading and throwing capacities thereof are respectively 3,000 t/h, and one voyage is achieved in 3 days, then it is possible to throw in the deep sea annually about 3,000,000 t or more per one ship, and if three transport ships 8 are associated with one marine float installation 6, then throwing into the deep sea of annually 10,000,000 t can be efficiently carried out by this one fleet of transport ships.

It is to be noted that since the work of loading or the like involves handling of liquid cargo, it is far easier as compared to the case of solid cargo.

The above-mentioned various numerical values merely indicate one preferred embodiment of the present invention, and so they can be widely changed within the scope of the present invention.

As described in detail above in connection to one preferred embodiment of the present invention, the method and system for throwing carbon dioxide into the deep sea according to the present invention can bring about the following advantages:

1. Since carbon dioxide gas collected from combustion exhaust gas or the like is liquefied before loading on a ship, the installation for liquefication is less expensive as compare to the case where it is solidified, and power consumed for operation of the installation also can be reduced. The work of loading on a ship and the like is also easier as compared to the case of solidification.
2. As liquefied carbon dioxide is thrown through a throw-in pipe reaching to the deep sea, loss of carbon dioxide in the midway of throwing is not present, and so, a throwing efficiency can be raised.
3. Since there is no evaporation loss during loading work onto a ship nor during transportation on the sea, and moreover, since throwing of liquefied carbon dioxide loaded on a ship into the deep sea is executed only through a throw-in pipe of a marine float installation, by monitoring the metering of throw-in at the marine float installation it can be easily and precisely known when, where and what amount of throw-in of carbon dioxide into the deep sea has been executed.

While a principle of the present invention has been described above in connection to one preferred embodiment of the invention, it is intended that all matter contained in the above description and illustrated in the accompanying drawings shall be interpreted to be illustrative and not in a limiting sense.

What is claimed is:

1. A method for discharging carbon dioxide into the deep sea, consisting of the steps of transporting carbon dioxide in a liquefied gas state on the sea by means of ships to a free floating marine float installation located offshore in the deep sea, and discharging the liquefied carbon dioxide into the deep sea through the lower end of a throw-in pipe reaching to a water depth of about 3,000 m at a distance of hundreds of meters above the sea bed, said pipe provided on a free floating marine float installation unattached to the sea bed and which pipe is always implemented to discharge the liquefied carbon dioxide into the deep sea.

2. A method according to clam 1 wherein the liquefied carbon dioxide, in a state close to its triple point, is transported on the sea.

3. A system for discharging liquefied carbon dioxide into the deep sea, comprising a liquefied gas transport ship for transporting liquefied carbon dioxide gas, and a free floating marine float installation unattached to the sea bed in which the liquefied carbon dioxide is transported thereto by means of said transport ship, said marine float installation being provided with a deep sea throw-in pipe reaching to a water depth of about 3,000 m, the lower end of which is positioned above the sea bed at a distance of hundreds of meters and which throw pipe is always implemented to discharge the liquefied carbon dioxide into the deep sea upon transfer thereto from said transport ship.

* * * * *